Nov. 7, 1944.　　J. R. BERNSTEIN　　2,362,237
SHOE TREE
Filed Dec. 18, 1942　　2 Sheets-Sheet 1

Inventor
Joseph R. Bernstein
By Richard L. Underwood
Attorney

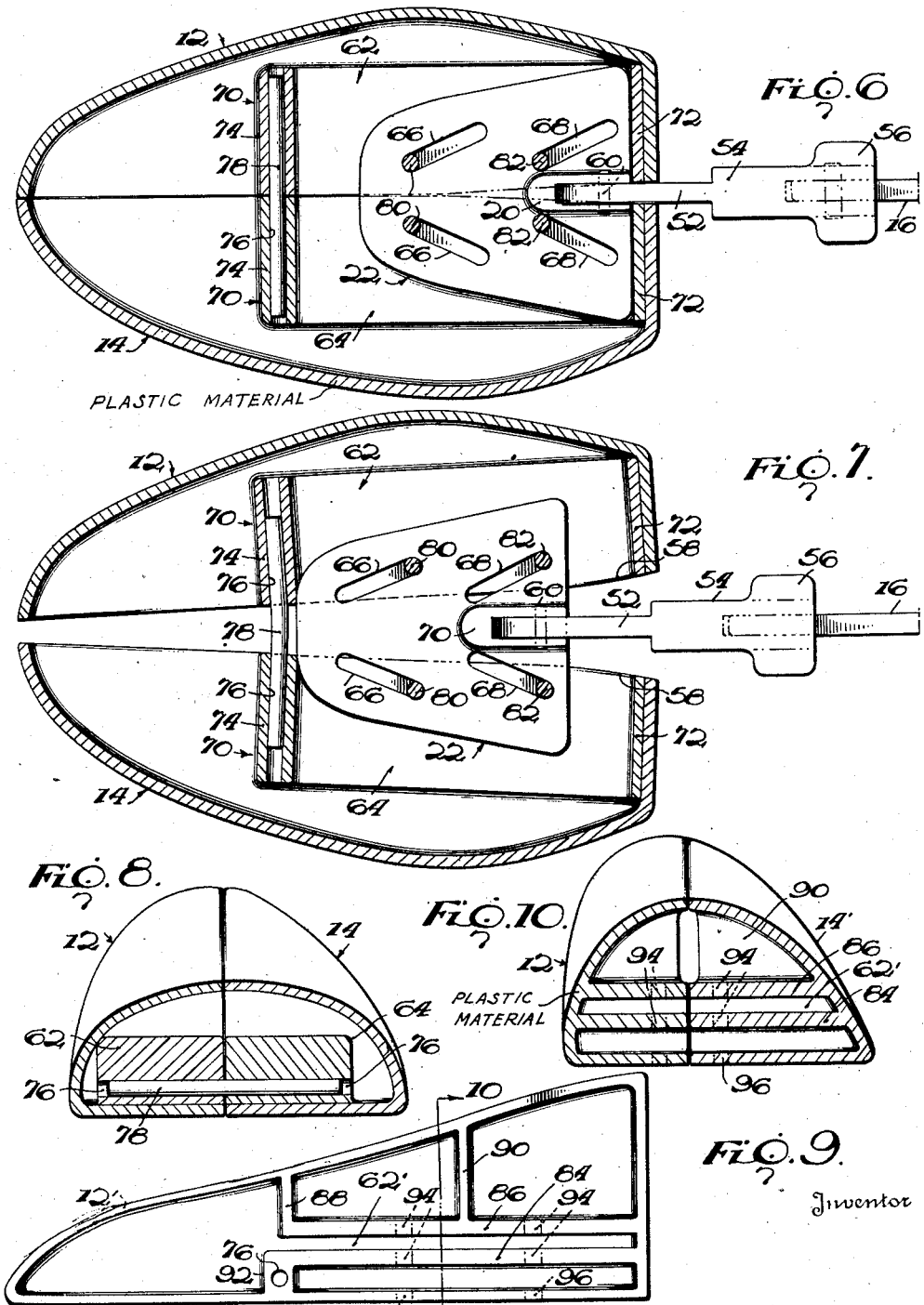

Patented Nov. 7, 1944

2,362,237

UNITED STATES PATENT OFFICE 2,362,237

SHOE TREE

Joseph R. Bernstein, Chicago, Ill.

Application December 18, 1942, Serial No. 469,483

8 Claims. (Cl. 12—128.2)

This invention relates to shoe trees and has particular reference to the extensible type which may be readily adjusted for various shoe sizes and which embodies toe spreader sections.

An object of the invention is to construct a shoe tree of this type having hollow toe spreader sections of light and inexpensive material. There are a number of well known types of trees incorporating spreader sections in the toe portion which are adapted to adjust themselves automatically more or less in conformity with the inner toe portion of any particular shoe. These for the most part embody solid toe spreader sections which, in themselves, provide strong and rigid resistance to the thrust exerted as the tree is extended in the shoe. A difficulty in providing hollow toe spreader sections which are at the same time so associated with the rest of the tree that the sections automatically move apart when the tree is extended resides in obtaining a spreader section sufficiently rigid to withstand the rather severe axial and lateral thrusts which develop when the tree is properly inserted in the shoe, but which are quite essential in order to derive maximum benefit from use of the tree.

An important object of this invention is to so construct hollow spreader sections and associate them with the spreader mechanism that the thrust developed in operation of the tree is absorbed at a number of different points. In this way the hollow sections may be constructed of very light material without risk of distorting or rupturing the same in use, thus enabling exertion of sufficient force in spreading the sections to obtain maximum benefit from the device.

Still another object of the invention is to so construct and arrange the several component elements of a composite tree such as that broadly described above that all of the elements of the assembly may be molded from any suitable plastic material and assembled with a minimum expenditure of time and labor. This is a particularly valuable feature of the invention because it permits use of a wide variety of materials.

Various other objects and meritorius features of the invention will become apparent from the following description taken in conjunction with the drawings, wherein like numerals refer to like parts throughout the several figures, and wherein:

Figs. 6 and 7 are top plan views, partly in section, illustrating the spreader action and thrust absorption of my improved arrangement;

Fig. 8 is a section illustrating the spreader stabilizing pin;

Fig. 9 is a side elevation looking into the interior of a modified form of spreader section, and Fig. 10 is a vertical section along 10—10 of Fig. 9.

Figure 1:
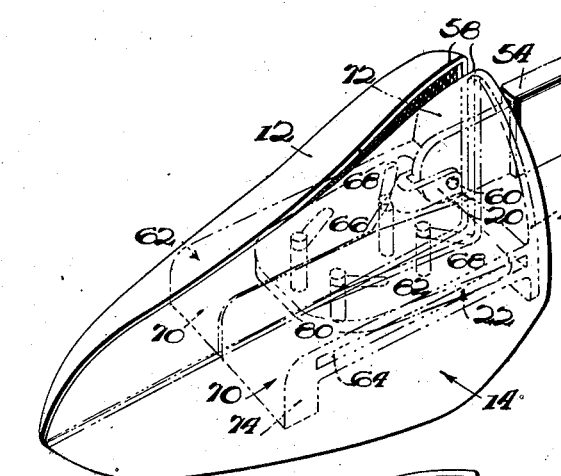
Figure 1 is a perspective of the tree assembly illustrating in dotted line the spreader mechanism within.

Referring to Fig. 1 initially, the assembly comprises a heel thrust member broadly indicated by the numeral 10 and a toe portion consisting of spreader sections 12 and 14, said heel and toe portions being joined by a toggle connection comprising rack bar 16 which is pivoted at its forward extremity to the rear extremity of operating link 52. Operating link 52 is in turn pivoted at its forward extremity to a boss 20 disposed rearwardly and centrally of a spreader plate 22 which is associated with the spreader sections 12 and 14 in a manner to be described in detail hereinafter.

The elements hitherto described may be composed entirely of molded plastic material. The heel thrust member broadly indicated by the numeral 10 comprises component sections 24 and 26, each of which sections is so formed as to provide an extended portion 28, the opposed faces of which are so recessed that when the two sections are joined together, as by means of a screw 30, a passage adapted to slidably receive rack bar 16 is formed.

Figure 2:
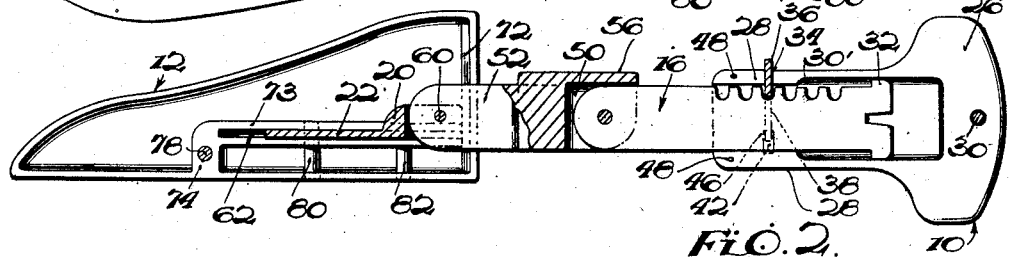
Fig. 2 is an elevation along a line slightly offset from the longitudinal median line of the assembly.
Figure 3:
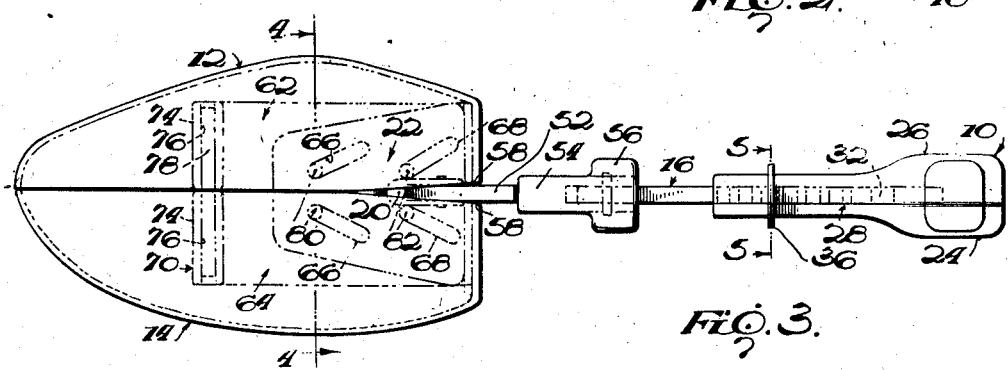
Fig. 3 is a top plan view.

The passage thus formed is restricted somewhat toward its forward end as indicated at 30' to cooperate with an enlarged rear terminal portion 32 of the rack bar to preclude withdrawal of the rack bar from within the passage. The composite forward extension of the heel thrust member is slotted vertically as indicated in Fig. 2 by the numeral 34 to permit passage therethrough of a locking member or saddle 36, the lower edge of which engages the teeth of rack bar 16 to lock the heel thrust member in adjusted position with reference to the rack bar.

Figure 5:
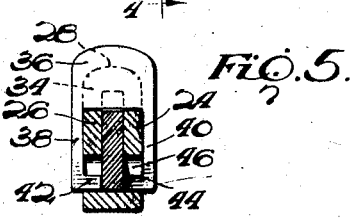
Fig. 5 is a section along 5—5 of Fig. 3.

The locking member or saddle 36 (Fig. 5) includes downwardly extending legs 38 and 40 which are toed in at their lower extremities with flanges 42 and 44 which engage in elongated slots 46 in each wall of the passage within which the rack bar is received. The entire locking member or saddle may be made of material sufficiently resilient to permit withdrawal of the flanges 42 and 44 from slots 46 and removal of the member from the assembly, or the legs alone may be sufficiently resilient to permit this removal operation when desired. As illustrated in Fig. 2, pins 48 extending laterally through the forward walls of the extended portion of the heel thrust member serve in conjunction with screw 30 to position the component sections of said heel thrust member with reference to one another.

The rack bar 16 is pivoted at its forward end between the walls of a recess 50 on the underside of the rear terminal portion of operating link 52. The link is somewhat wider at its rear than toward the forward end thereof as illustrated clearly at 54, the extreme rear of the upper surface of the link being winged or spread as indicated at 56 to facilitate manual application of pressure to extend the tree.

The forward portion of operating link 52 extends into the hollow spreader sections 12 and 14 between cut-away portions 58 and is pivoted therein, as by means of a pin 60, within slotted boss 20 which is positioned centrally and at the rear extremity of spreader plate 22, and is preferably integral therewith.

Positioned within each hollow spreader section 12 and 14 by some suitable means are opposed guide slots 62 and 64 which extend longitudinally of the spreader sections intermediate the top and bottom thereof and receive the spreader plate 22 for slidable movement therein. The spreader plate is provided with longitudinally spaced pairs of cam slots 66 and 68, each slot of each pair being symmetrically disposed with reference to the other of the pair on opposite sides of the longitudinal median line of the spreader plate. Both pairs of slots are angularly disposed with reference to the median line of the plate and the median line of the tree assembly, but the forward slots 66 are positioned at a less angle to the median line than the rear slots 68 for reasons which will be clearly brought out hereinafter.

Figure 4:
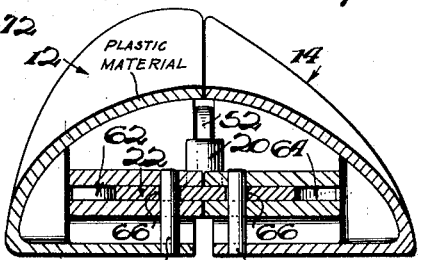
Fig. 4 is a section along 4—4 of Fig. 3.

While there are doubtless other ways of disposing the guide slots 62 and 64 within the hollow toe spreader sections 12 and 14, two eminently satisfactory arrangements for accomplishing this end have been illustrated herein. In the embodiment illustrated in Figs. 1-8, each hollow spreader section is provided with an insert, broadly indicated in Fig. 1 by the numeral 70, having a rear wall 72 in substantial conformity with the contour of the rear wall of the hollow spreader section, and a front supporting foot 74. This insert may be held in position by any suitable means, but the wedging effect of the rear wall 72 within the hollow spreader section, together with guide pins which will be described more in detail hereafter, suffices for this purpose. A slot is formed in the side wall of the inner face of that portion 73 of each insert which extends longitudinally between its rear wall 72 and supporting foot 74, and which is spaced intermediate the top and bottom of the spreader section, as illustrated clearly in Figs. 2 and 4. In the modification herein illustrated each insert is of somewhat skeleton form, the forward foot 74 being of sufficient thickness to form therein socket 76 adapted to freely receive a pin 78 which tends to hold the spreader sections 12 and 14 in lateral alignment during manipulation of the tree and should preferably be of somewhat resilient material in order to absorb a slight bending stress which will be more apparent as the description proceeds.

Extending through slots 62 and 64 at longitudinally spaced intervals therealong are pins 80 and 82, which pins are received through the slots 66 and 68 of the spreader plate 22. Pins 80 and 82 are anchored in some suitable manner in or to the bottom wall of the hollow spreader sections.

In the modified form of spreader section 12' illustrated particularly in Figs. 9 and 10, the entire section is integral and may be molded of a plastic or formed in any other suitable fashion as a unit. Slot 62' is formed between two horizontal webs 84 and 86 which extend inwardly from the side wall of each section, the upper web 86 being joined to the upper wall of the section by means of spaced transverse webs 88 and 90. Joining the bottom wall of the spreader section and web 84 is a foot 92 in which is formed socket 76 for receiving an end of transverse stabilizing rod 78. The web formations within the hollow sections of this embodiment are particularly useful in that they not only serve to provide the functional features hitherto described with reference to the other embodiment but constitute rigidifying and strengthening members as well. Horizontal webs 84 and 86 are apertured as indicated at 94 in Figs. 9 and 10 to receive the pins which extend transversely across the slots formed therebetween and the bottom of the section may be apertured as indicated at 96 to receive the base of said pins.

The only functional difference between the embodiment last described and that initially described resides in the fact that the slots 62' are open at their forward end whereas slots 62 terminate at a point intermediate the length of the spreader sections. However, it will be apparent that the slots 62' might easily be closed at their forward ends by extending the vertical web 88 down to the foot 92 of lower horizontal web 84. The functional difference will become apparent from the following description of the operation of the device.

When the tree is inserted in a shoe and pressure exerted on operating link 52, the cam plate 22 pivoted to the forward end thereof moves forwardly in guide slots 62 and 64 with reference to the spreader sections 12 and 14. As the pairs of cam slots 66 and 68 are pushed past the pins 80 and 82, which latter are fixed with reference to the spreader sections, the resultant camming action tends to spread apart the toe sections. The pressure of both lateral and forward thrust components is absorbed at spaced points by pins 80 and 82. By virtue of the difference in angularity of slots 66 and 68, the spreading movement is more rapid at the rear of the toe sections, slots 68 being at a greater angle to the longitudinal median line of the assembly than slots 66. While the forward portions of the spreader sections will likewise tend to move apart, the spreading movement at that point will not be so rapid and the spreader sections when fully spread will be in the position illustrated in Fig. 7. Fig. 6 illustrates the relative positioning of the spreader sections when the insertion operation begins.

When the spreader plate has moved the slots 66 and 68 with reference to the toe sections 12 and 14 to the point where the pins reach the rear ends of the slots, the entire thrust on sections 12 and 14 will be in a forward or axial direction and transmitted through the pins. This thrust is absorbed, as downward pressure on thumb saddle 56 continues, at four spaced points within the spreader sections represented by pins 80 and 82. The length of slots 62, the size of cam plate 22, and the length and positioning of cam slots 66 and 68 are so arranged that pins 80 and 82 reach the rear extremity of their respective slots simultaneously, and at the same time, in the embodiment illustrated in Figs. 1–7, the forward edge of cam plate 22 abuts the end of the guide slots 62 and 64 in which it is received. Thus the axial thrust, where the forward ends of slots 62, or 62' if desired, are closed, is absorbed not only by the four spaced pins but by the entire forward edge of the cam plate 22 bearing against the forward walls of the cam plate guide slots (as shown in Fig. 7), further distributing the forces which might otherwise tend to rupture or distort the toe spreader sections 12 and 14, or some operative portion thereof, and render the tree useless.

During the spreading action of toe sections 12 and 14, lateral alignment and stabilization is facilitated by transversely extending pin 78, any slight bending stress transmitted thereto by reason of the controlled differential in spreading between the front and rear portions of the spreader sections being absorbed by a slight amount of resiliency in the pin or a slight oversize in the sockets 76 in which the pin is received. Slots 66 and 68 may be somewhat wider than the diameter of pins 80 and 82 with which they are associated if an extreme amount of what might be termed "wobble" is desired in the toe spreader sections. Such wobble may likewise be secured by making the guide slots 62, 64, or 62' somewhat wider than the width of cam plate 22 which is received within the slots. Such wobble may be desirable at times to permit closer conformity of each spreader section with the particular contours of the upper of any shoe with which it may be associated.

The ease of adjusting the length of the assembly to various shoe sizes by manipulation of the locking member of saddle 36 in conjunction with the teeth of the rack bar 16 may be further facilitated by making the rack bar itself of opaque substance and the extended portion of the heel thrust member of transparent material through which the particular notch in which the locking member is secured may be observed.

Having described and illustrated certain embodiments of my invention, others may be apparent to those skilled in the art and for that reason I wish to be limited only within the scope of the appended claims.

What I claim is:

1. A shoe tree comprising heel and toe portions and a toggle connection between the two, said toe portion including transversely aligned hollow spreader sections having, respectively, opposed aligned guide slots therein extending longitudinally from the rear thereof, one end of said toggle connection terminating in a spreader plate seated in said guide slots and slidable therealong, oppositely disposed pins extending transversely through the guide slots at spaced points along their lengths, and longitudinally spaced cam slots in each side of the spreader plate forming oppositely disposed pairs receiving said pins, each pair of cam slots being of less angularity with respect to the longitudinal median line of the spreader plate than the adjacent rearwardly disposed pair.

2. A shoe tree comprising heel and toe portions and a toggle connection between the two, said toggle including a spreader plate secured to its forward end, longitudinally spaced pairs of angularly disposed cam slots in said spreader plate, said toe portion including a pair of hollow spreader sections having oppositely disposed aligned longitudinal guide slots therein receiving opposite sides of the spreader plate, and pins extending transversely through the guide slots and the cam slots of the spreader plate, the guide slots terminating at their forward end in a rigid wall, the relative size, length and positioning of said spreader plate, guide slots, cam slots and pins being such that the pins are in the rear ends of the cam slots when the spreader plate abuts the forward ends of the guide slots.

3. A shoe tree comprising heel and toe portions and a toggle connection between the two, said toggle including a spreader plate secured to its forward end, longitudinally spaced pairs of angularly disposed cam slots in said spreader plate, said toe portion including a pair of hollow spreader sections having oppositely disposed aligned longitudinal guide slots therein receiving opposite sides of the spreader plate, and pins extending transversely through the guide slots and the cam slots of the spreader plate, the relative size, length and positioning of said spreader plate, cam slots and pins being such that the pins reach the rear ends of the cam slots simultaneously on forward movement of the spreader plate in its guide slots.

4. A shoe tree comprising heel and toe portions and a toggle connection between the two, said toggle including a spreader plate secured to its forward end, longitudinally spaced pairs of angularly disposed cam slots in said spreader plate, each pair of cam slots being of less angularity with respect to the longitudinal median line of the assembly than the adjacent rearwardly disposed pair, said toe portion including a pair of hollow spreader sections having oppositely disposed aligned longitudinal guide slots therein receiving opposite sides of the spreader plate, and pins extending transversely through the guide slots and the cam slots of the spreader plate, the guide slots terminating at their forward end in a rigid wall, the relative size, length and positioning of said spreader plate, guide slots, cam slots and pins being such that the pins are in the rear ends of the cam slots when the spreader plate abuts the forward ends of the guide slots.

5. A shoe tree comprising heel and toe portions and a toggle connection between the two, said toggle including a spreader plate secured to its forward end, longitudinally spaced pairs of angularly disposed cam slots in said spreader plate, each pair of cam slots being of less angularity with respect to the longitudinal median line of the assembly than the adjacent rearwardly disposed pair, said toe portion including a pair of hollow spreader sections having oppositely disposed aligned longitudinal guide slots therein receiving opposite sides of the spreader plate, and pins extending transversely through the guide slots and the cam slots of the spreader plate, the relative size, length and positioning of said spreader plate, cam slots and pins being such that the pins reach the rear ends of the cam slots simultaneously on forward movement of the spreader plate in its guide slots.

6. An extensible shoe tree comprising a heel thrust member having a forward extension including a longitudinal passage therein, a rack bar slidable within said passage, means carried by said extension cooperable with the teeth of said rack bar for adjustably positioning the two in fixed relation to each other, an operating link pivoted to the forward end of said rack bar, a toe portion including a pair of hollow spreader sections, and a spreader plate pivoted to the forward end of said operating link operatively connected with said spreader sections.

7. A shoe tree comprising heel and toe portions and a toggle connection between the two, said toggle having a spreader plate secured to its forward end, longitudinally spaced pairs of slots in said spreader plate symmetrically disposed on opposite sides of its median line in angular relation thereto, said toe portion including a pair of hollow spreader sections, spaced strengthening and rigidifying webs inside each section forming oppostely disposed aligned longitudinal guide slots therein receiving opposite sides of the spreader plate, and pins extending transversely through the guide slots and the cam slots of the spreader plate.

8. A shoe tree comprising heel and toe portions and a toggle connection between the two, said toggle having a spreader plate secured to its forward end, longitudinally spaced pairs of slots in said spreader plate symmetrically disposed on opposite sides of its median line in angular relation thereto, said toe portion including a pair of hollow spreader sections, spaced strengthening and rigidifying webs inside each section extending parallel to the bottom wall thereof and forming oppositely disposed aligned longitudinal guide slots therein receiving opposite sides of the spreader plate, transverse webs in each section joining one of said last-mentioned webs and the top wall of the section, and pins extending transversely through the guide slots and the cam slots of the spreader plate.

JOSEPH R. BERNSTEIN.